US012580886B2

(12) United States Patent
Monnier et al.

(10) Patent No.: US 12,580,886 B2
(45) Date of Patent: Mar. 17, 2026

(54) NETWORK SECURITY GATEWAY ONBOARD AN AIRCRAFT TO CONNECT LOW AND HIGH TRUST DOMAINS OF AN AVIONICS COMPUTING INFRASTRUCTURE

(71) Applicant: THALES, Courbevoie (FR)

(72) Inventors: Stéphane Monnier, Merignac (FR); Alexandre Noinski, Merignac (FR); Alexandre Fine, Merignac (FR)

(73) Assignee: THALES, Courbevoie (FR)

( * ) Notice: Subject to any disclaimer, the term of this patent is extended or adjusted under 35 U.S.C. 154(b) by 135 days.

(21) Appl. No.: 18/307,500

(22) Filed: Apr. 26, 2023

(65) Prior Publication Data

US 2023/0353536 A1     Nov. 2, 2023

(30) Foreign Application Priority Data

Apr. 29, 2022     (FR) ..................................... 22 04073

(51) Int. Cl.
*H04L 9/40*          (2022.01)
*H04L 45/42*         (2022.01)
(52) U.S. Cl.
CPC .......... *H04L 63/0236* (2013.01); *H04L 45/42* (2013.01); *H04L 63/0254* (2013.01)
(58) Field of Classification Search
CPC .. H04L 63/0236; H04L 45/42; H04L 63/0254
USPC ......................................................... 726/11
See application file for complete search history.

(56) References Cited

U.S. PATENT DOCUMENTS 8,161,529 B1 *   4/2012  Bortz .................... H04L 63/105
                                                    713/166
8,397,286 B2     3/2013  Declety et al.

9,712,490 B1 *   7/2017   Burns ................... H04L 63/168
10,771,345 B1 *  9/2020   Louca ..................... H04L 43/16
11,063,886 B2 *  7/2021   Shani ...................... H04L 45/74
11,831,609 B2 *  11/2023  Neystadt ................. H04L 45/74
2010/0299742 A1 *  11/2010  Declety .............. H04L 63/0209
                                                         726/13
2022/0103578 A1 *  3/2022  Srivastav ............... H04L 67/12

FOREIGN PATENT DOCUMENTS

EP          3 068 101          11/2020
FR            2922705 A1 *    4/2009   ......... H04L 63/0209
WO     WO-2005114947 A1 *   12/2005   ........... H04L 63/123

OTHER PUBLICATIONS

Preliminary Search Report dated Dec. 2, 2022 in FR 2204073.

* cited by examiner

*Primary Examiner* — Lynn D Feild
*Assistant Examiner* — Saad Ahmad Abdullah
(74) *Attorney, Agent, or Firm* — B. Aaron Schulman, Esq.; Stites & Harbison, PLLC

(57)          ABSTRACT

The gateway, which connects a low-trust domain (12) and a high-trust domain (13) of an avionics computing infrastructure, provides a plurality of security functions, each function being performed by a data processing node. The gateway comprises, connected in series along a filtering chain of a data flow received from the low-trust domain: a firewall data processing node (4); a protocol break data processing node (5); a master data processing node (1) and an inverse protocol break data processing node (6), the gateway further including a security data processing node (2) connected to each of the data processing nodes of the filtering chain, the different data processing nodes being physically segregated.

14 Claims, 2 Drawing Sheets

Figure 1:
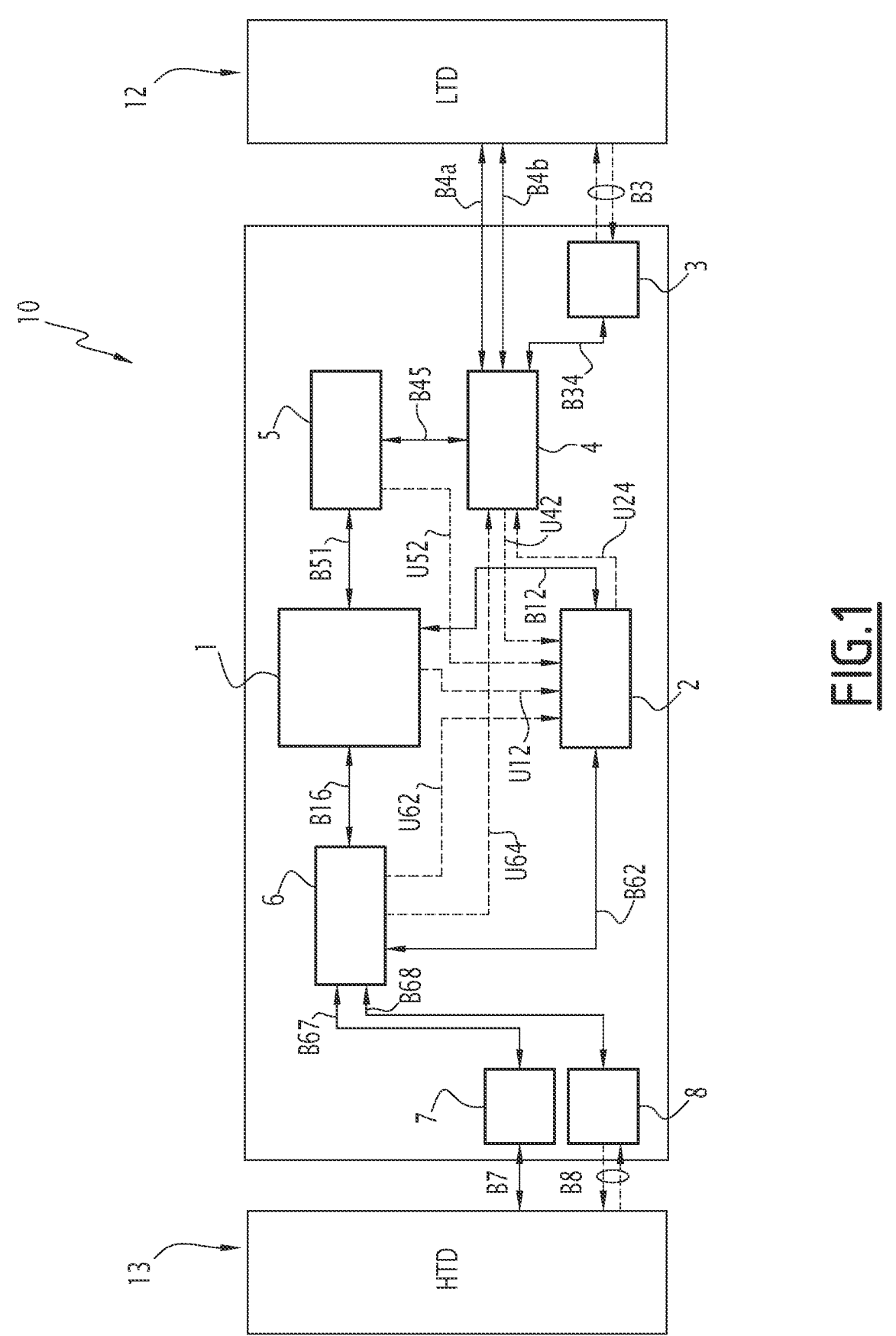

NETWORK SECURITY GATEWAY ONBOARD AN AIRCRAFT TO CONNECT LOW AND HIGH TRUST DOMAINS OF AN AVIONICS COMPUTING INFRASTRUCTURE

The present invention relates to network security gateways intended for being taken onboard civil or military aircraft.

A network security gateway is used for an interconnection between two computer domains which are characterized by different levels of criticality, in particular between a low-trust domain and a safety-critical domain of the aircraft like e.g. the Aircraft Control Domain (ACD).

Such interconnection can be permanent, e.g. in the case of two aircraft networks used during a flight phase, or temporary, e.g. in the case of maintenance equipment connected to the aircraft during a ground maintenance phase.

The gateway is used for to protecting the domain of higher criticality by filtering the data flows coming from the domain of lower criticality, by rejecting the data flows which are not compatible with the highest criticality level, in particular data flows corresponding to malicious computer attacks.

Such a gateway has to be developed with the highest level of development for security ("SAL 3" level in the repository defined by the ED-203A standard) while ensuring good cybersecurity properties, in particular making impossible for an attacker to bypass the filtering functions implemented by the gateway.

However, complying with such development requirements and checking for ensuring the level of security which is actually provided, are major difficulties.

The goal of the present invention is to propose a gateway architecture for addressing such problems.

For this purpose, the invention relates to a network security gateway intended to be taken onboard an aircraft in order to connect a low-trust domain and a high-trust domain of an avionics IT infrastructure, the gateway providing a plurality of security functions, each function being performed by a data processing node, the gateway including, connected in series along a filtering chain of a data flow received from the low-trust domain: a firewall data processing node; a protocol break data processing node; a master data processing node; and an inverse protocol break data processing node, the gateway further including a security data processing node connected to each of the data processing nodes of the filtering chain, the different data processing nodes being physically segregated.

According to particular embodiments, the gateway includes one or more of the following features, taken individually or according to all technically possible combinations:

the nodes of the filtering chain are connected by bidirectional links, preferably in the Ethernet format, more preferentially in the 1 Gbit/s Ethernet format, having a larger bandwidth than the bandwidth of the connections used for connecting the gateway to the high- and low-trust domains.

the service node is connected by unidirectional links to the plurality of nodes of the filtering chain, preferentially in serial format, preferentially yet in synchronized serial format.

the gateway forms an Ethernet and/or ARINC 429 and/or ARINC 664 interface with the high trust-domain, and an Ethernet and/or ARINC 429 and/or ARINC 664 interface with the low-trust domain.

the firewall data processing node is connected to the low-trust domain by a first conversion module, performing a conversion of a format of a data flow coming from the low-trust domain, preferably the ARINC 429 format, in a data format expected by the firewall data processing node.

the one inverse protocol break processing node is connected to the high-trust domain by a second conversion module, performing a conversion of a format of a data flow delivered by the inverse protocol break processing node, preferably the 100 Mbit/s Ethernet format, in a format expected by the low-trust domain, preferentially the ARINC 664 format, more preferentially the ARINC 664 P3 or the P7 format.

the master data processing node filters a data flow according to a context or according to a level of priority.

the master data processing node executes an intrusion detection application and the detection information generated by the intrusion detection application is sent to the service processing node as entries of a log file.

any data flow coming from the low-trust domain passes through the master data processing node, provided that the data flow has not been rejected by the firewall data processing node or by the protocol break data processing node.

in addition to the interface with the low-trust domain firewall, the firewall data processing node has only one output port forcing the routing of any operational data flow coming from the low-trust domain to the protocol break data processing node, and wherein, in addition to the interface thereof with the firewall data processing node, the protocol break data processing node has only one output port which forces the routing of any operational data flow coming from the low-trust domain, to the master data processing node.

any data flow coming from the high trust domain to the low-trust domain and which does not pass through the master data processing node is routed through the gateway via at least one unidirectional link.

the gateway has only one firewall data processing node situated at the input of the filtering chain on the side of the low-trust domain.

Figure 2:
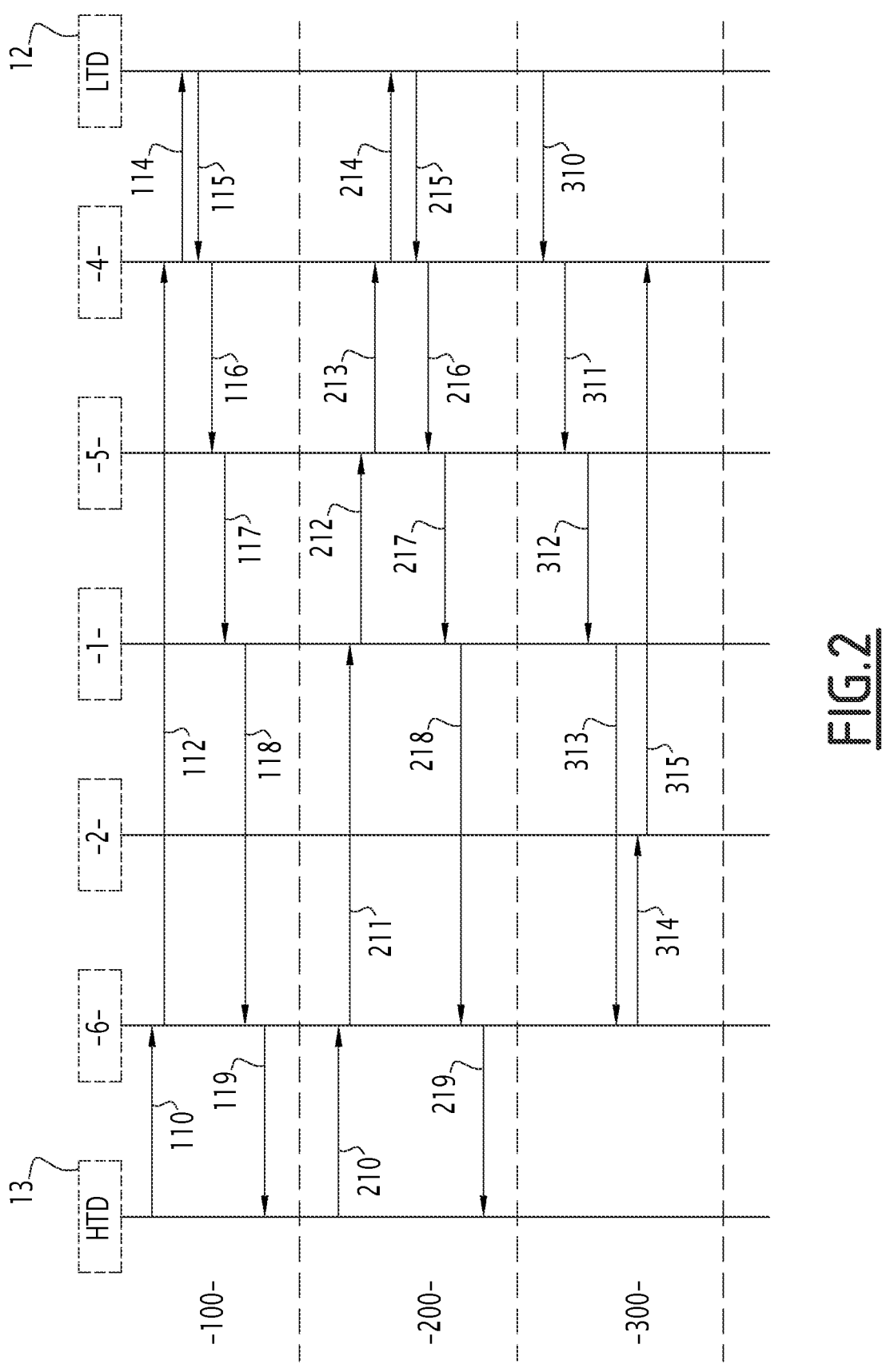

The invention and the advantages of the invention will better understood upon reading the following detailed description of the different embodiments of the invention, given only as examples and not limited to, the description being made with reference to the enclosed drawings, wherein:

FIG. 1 is a schematic representation of a preferred embodiment of the avionics security gateway according to the invention; and, FIG. 2 is a chronogram showing different examples of operation of the gateway shown in FIG. 1.

STRUCTURE

With reference to FIG. 1, the architecture of the gateway according to the invention will be presented. In said figure, the bidirectional links are in solid lines while the unidirectional links are in dotted lines.

The network security gateway 10 is onboard an aircraft. Same is placed at the interface between a low-trust domain 12, or "LTD" domain, and a high-trust domain 13, or "HTD" domain, of an avionics IT infrastructure. E.g., the domain 13 corresponds to the control domain of the aircraft and domain 12 corresponds to another domain onboard the aircraft or temporarily connected to the aircraft.

The function of the gateway 10 is to ensure a secure transfer of data at least from the low-trust domain 12 to the high-trust domain 13. To this end, the gateway 10 filters the data flows, while being robust against computer attacks seeking to bypass the filtering.

Preferentially, the gateway 10 is an Ethernet/Ethernet gateway. Alternatively, same is an ARINC 429/ARINC 429 gateway. More generally, same is an Ethernet and/or ARINC 429 and/or ARINC 664 gateway (preferentially ARINC 664 P3 or P7) on the low-trust domain side and an Ethernet and/or ARINC 429 and/or ARINC 664 gateway (preferentially ARINC 664 P3 or P7) on the high-trust domain side.

The architecture of the gateway 10 is preferentially based on a single electronic card 11 supporting a plurality of data processing nodes, each node being dedicated to the implementation of one or a plurality of specific security functions. Hence, it is a question of distributed architecture.

A node can be any type of device having its own computing resources, memory, and communication port. Preferentially, same is a microcontroller, insofar as such a component has a reduced consumption, which hence limits the problems of heat dissipation, a critical issue in the avionics field. Alternatively, same is a programmable logic circuit, such as e.g. an FPGA ("Field-Programmable Gate Array").

The different functions are thus physically segregated.

The card 11 thus supports a master node 1. The master node 1 performs the filtering function as such.

Card 11 further supports a plurality of slave nodes. In the embodiment shown in FIG. 1, four slave nodes are provided, numbered 2, 4, 5 and 6. The nodes have the functions of security, firewall, formatting and inverse formatting, respectively.

The card 11 further supports a plurality of conversion devices. In the embodiment shown in FIG. 1, three conversion devices are provided for, numbered 3, 7 and 8.

Such nodes and conversion devices communicate with each other via links.

The firewall 4, formatting 5, master 1, and inverse protocol break 6 data processing nodes are connected in series so as to form a data flow filtering chain.

The security data processing node 2 is connected to each of the data processing nodes of the filtering chain.

The master node 1 is thus "buried" within the card 11, in the sense that same has no direct interface with either of the domains 12 and 13.

The architecture of the gateway is such that a data flow coming from the low-trust domain 12 is forced to pass successively through the firewall node 4, the formatting node 5 and the master node 1. Such constraint is physically achieved by means of the communication links between the nodes: the single operational communication channel leaving the node 4 (outside the interface towards the low-trust domain) leads to the node 5 and the single operational communication channel leaving the node 5 (outside the interface towards the node 4) leads to the node 1.

On the low-trust side of the gateway (i.e. nodes 4, 5 and 1), there are communication channels between each of nodes 4, 5 and 1 on the one hand, and node 2 on the other hand, but said channels, along the links U42, U52 and U12, are used only for transferring information on the operation, as generated by a node towards a log file stored by the node 2.

For communication between an application of the low-trust domain 12 and a service of the node 2 (such as a control application using the log file stored by the node 2), the upward query communications are received by the node 1 and then sent after filtering to the node 2 via the link B12, and the downward response communications are sent by the node 2 or to the node 1 via the link B12 (a case e.g. of contextual filtering implemented by the node 1), or directly to the node 4 via link U24 (so as to communicate directly and thus more quickly with the domain 12).

Firewall Node 4

The firewall node 4 is positioned at the front-end with the low-trust domain 12 from which computer attacks can come.

Same has at least one input/output port for establishing a bi-directional link with the domain 12. Preferentially, same has three ports for establishing:

a first B4A link, direct with the domain 12, e.g. a network of the aircraft during a flight phase. Same is e.g. a 100 Mbit/s Ethernet link;

a second link B4B, direct with the domain 12, e.g. for connection to maintenance equipment during a maintenance phase on the ground. Same is e.g. a 100 Mbit/s Ethernet link;

a third link B34, indirect with the domain 12, via the first conversion module 3.

The first conversion module 3 is used for converting a data flow coming from the domain 12, e.g. in the ARINC 429 format, into a data flow in the required format on the link B34. The link B34 is e.g. an SPI bus or an asynchronous serial link.

The first module 3 is connected directly to the domain 12 by a bidirectional link B3, e.g. consisting of two unidirectional links for providing bidirectionality.

The firewall node 4 also has an I/O port for establishing a bidirectional B45 link with the deformatting node 5.

The firewall node 4 has an output port for establishing a unidirectional U42 link with the security node 2.

The firewall node 4 has an entry port for establishing a unidirectional U24 link with the security node 2.

The firewall node 4 has an entry port for establishing a unidirectional U64 link with the reformatting node 6.

This first node 4 in the data filtering chain provides a first level of firewall filtering. Same executes different security checking rules on the data flows received from the domain 12.

If the data flow coming from the domain 12 is accepted by the node 4, it is resent to the node 5.

On the other hand, if the flow is rejected, the node 4 generates logging information and sends the information to the security node 2.

The firewall node 4 performs e.g. the following filtering:

accepting a low-trust domain flow only if same is declared, e.g. that same includes the identifier of a declared UDP port;

checking the frame size of the low-trust domain flow, the size having to be according to the configurable values (minimum size/maximum size);

checking that, for a given flow, the frequency of reception of the frames is according to with values which are also configurable;

checking that the IP address of the source of the flow is according to an authorized list of values, the list being configurable.

If the module 4 rejects a frame of the flow, the information of the header of the frame is sent to the service module 2. An aggregation of the header information is advantageously performed by the module 4 when too many frames are rejected.

Formatting Node 5

The node 5 is positioned between the node 4 and the master node 1 in the data filtering chain.

Same has an I/O port for establishing the B45 bidirectional link with node 4 and an I/O port for establishing a B51 bidirectional link with the master node 1.

The node 5 has an output port for establishing a unidirectional U52 link towards the security node 2.

The node 5 provides a second level of filtering by modifying the format of the flows.

Thereby, for a data flow coming from the low-trust domain, the module 5 performs a protocol break. Same determines the nature of the incident flow, i.e. the format thereof. E.g. the data flow relates to a flight plan or to the download of a software. The node 5 then converts the incoming flow into a neutral format. If the protocol break is successful (in the sense that the message contained in the incoming data flow is consistent, without syntax errors), the flow is resent, in the neutral format, to the master node 1. On the other hand, if the incident flow is rejected, the node 5 generates new logging entries and sends same to the security node 2 via the link U52.

For a data flow coming from the high-trust domain, the module 5 performs an inverse protocol break. Same receives a data flow in neutral format from the master node 1. Same converts the flow to the required format before sending same to the firewall node 4.

The neutral format is not standardized and depends on implementations.

Master Node 1

In the data filtering chain, the master node 1 is positioned between the deformatting node 5 and the reformatting node 6.

Same has an I/O port for establishing a bidirectional B51 link with the node 5 and an I/O port for establishing a bidirectional B16 link with the node 6.

In addition, same has an output port for establishing a unidirectional U12 link with the security node 2.

The master node 1 performs different filtering operations.

E.g., the master node performs a domain-of-use filtering, where each datum presented in the neutral format of the protocol break is filtered with respect to the value the datum is supposed to represent. E.g.: filtering a text field by eliminating certain special characters; filtering a speed field with regard to values potentially reached by the aircraft; prohibiting flows of a certain nature depending on the phases of the aircraft (flight, taxiing, ground maintenance, etc.), where such and such datum has no reason to be there.

E.g. again, the master node 1 applies a fast filtering or a slow filtering so as to observe a latency time adapted to the nature of the incoming flow, as identified by the node 5. It is possible in this way to limit the crossing time of certain so-called critical flows. The master node 1 gives thus priority to the critical flows by same processing in a dedicated task, whereas the other non-critical flows are processed in a general task.

E.g. again, the master node 1 applies a contextual filtering. E.g., if a first request message flows from the domain 13 to the domain 12, the master node 1 expects to filter the corresponding response message that the domain 13 will send to the node 12. The master node 1 thus applies a processing for checking the consistency of the exchanges between the two domains.

The master node 1 advantageously performs tests monitoring the correct operation of the electronic card 11 and of the components of the card. The execution of a test is e.g. initiated in a ground maintenance phase.

The master node 1 advantageously performs a filtering of the requests to switch to downloading, in particular on the correct format of such requests, the downloading then consisting in importing information for the operation of the gateway (firewall configuration value, software update for achieving a protocol break from data format to neutral format, etc.)

E.g., in a maintenance phase on the ground, maintenance equipment is connected to the gateway 10 for updating a software of the firewall module 4. The equipment transmits a download request, which is thus filtered by the firewall module 4, which sends same to the protocol break module 5, which sends same to the master module 1.

Finding that it is a question of a download request, the master node 1 checks a whole series of conditions. Such conditions include e.g. the fact that an item of equipment is actually connected to the gateway and that the aircraft's operating phase corresponds to a ground maintenance phase, etc. In the event of a positive check, the node 1 is apt to modify the operating mode of the gateway from a maintenance mode e.g. to a download mode.

The node 1 is apt to generate an interrupt signal leading to the restart of the gateway, i.e. to the restart of each of the nodes.

The master node 1 advantageously executes an HIDS (Host-based Intrusion Detection System) application on all the flows that same filters. To run such application, the intrusion detection application needs environment data coming from all of the nodes and centralized by the security node 2. Hence the presence of the bidirectional communication link B12 between the master node 1 and the security node 2 for the exchange of such data.

The detection information generated by the application, form log entries maintained by the security node 2. Such information is sent by the node 1 to the node 2 via the link U12.

Once the flow has been filtered, the master node 1 sends the flow back to the reformatting node 6.

If the flow is rejected, logging information is generated and sent to the security node 2 via the link U12.

The master node 1 is developed with the highest level of cyber quality assurance (SAL3).

Inverse Formatting Node 6

The node 6, downstream of the master node 1 in the filtering chain, performs a formatting function which is the inverse of the function performed by the formatting node 5.

Thereby, for a data flow coming from the low-trust domain which has undergone a protocol break upon crossing the node 5, the node 6 performs an inverse protocol break for switching from the neutral format to a format expected by the high-trust domain 13.

On the other hand, for a data flow coming from the high-trust domain and having to be routed towards the node 1, the node 6 performs a protocol break. On the other side of the master node 1, the node 5 will have to perform the inverse protocol break to switch from the neutral format to a format expected by the firewall node or the low-trust domain.

In the embodiment shown in FIG. 1, the node 6 has an input/output port for establishing the bidirectional B16 link with the master node 1.

Same has an input/output port for establishing a bidirectional B67 link with the second conversion module 7.

Same has an input/output port for establishing a bidirectional B68 link with the third conversion module 8.

Same has an input/output port for establishing a B62 link with the security node 2. The link is used unidirectionally from the node 6 to the node 2. The link is only used bidirectionally when downloading from a downloading equipment positioned in the domain 13.

The node 6 also has an output port for establishing a unidirectional U62 link to the security node 2.

The node 6 has an output port for establishing the unidirectional U64 link to the firewall node 4.

If the inverse protocol break is successful, the flow is resent to the high-trust domain 13.

On the other hand, if the flow is rejected, the node 6 generates logging information and sends the information to the security node 2.

The second conversion module 7 is used for converting a data flow coming from the node 6 into a data flow in the format required by the domain 13. The second module 7 is connected directly to the domain 13 by a bidirectional link B7, preferably ARINC 664 P3 or ARINC 664 P7, at 100 Mbit/s or, if appropriate, more.

The third conversion module 8 is used for converting a data flow coming from the node 6 into a data flow in the format required by the domain 13. The third conversion module 8 is connected directly to the domain 13 by a bidirectional link B8, preferably ARINC 429.

It should be noted that a flow coming from a high-trust domain has to be transmitted by the inverse formatting node 6 either by the master node 1 or directly to the firewall node 4. The condition of routing a flow through the node 6 results from a configuration of the latter. E.g., the routing condition depends on the format of the data of the flow to be processed.

Security Node 2

The node 2 performs different security functions.

Same has an input/output port for establishing the bidirectional B12 link with the master node 1, and an input/output port for establishing the bidirectional B62 link with the node 6.

Same has input ports for establishing connections U42, U52, U12, and U62.

Same has an output port for establishing a unidirectional U24 link with the firewall module 4.

The node 2 ensures the saving of security events and the transmission thereof in a log file. The log file is saved e.g. in the SYSLOG format.

The security node 2 ensures the saving and the transmission of the data associated with the correct functioning of the gateway. Such function is known e.g. to a person skilled in the art under the name "BITE" (Built In Test Equipment). It is a question of performing, cyclically or depending on initiating events, appropriate tests on the different components of the gateway.

The security node 2 is in charge of downloading exchanges with an external item of equipment, once the transfer to downloading has been validated by the master node 1. To respond to a request to download the log file sent by an application in the low-trust domain 12 and validated by the node 1, the node 2 can send the data via the link B12, or when there is a simple query, via the U24 link directly to the firewall node 4. The U24 link is thus used to efficiently respond to simple download requests.

The communications internal to the card 11 use distinct technologies, e.g. Ethernet and serial. E.g.:

the bidirectional links B45, B51 and B16 are Ethernet data buses, preferably at 1 Gbit/s;

the B62 bidirectional links are Ethernet data buses, preferentially 100 Mbit/s;

the B34 link is a synchronized bus (SPI for "Serial Peripheral Interface") or an asynchronous serial link;

the links B67 and B68 are a PCI or PCI Express buses;

and the different unidirectional links are e.g. serial data buses, preferentially synchronized (SPI for "Serial Peripheral Interface"), but which can be asynchronous in a variant.

Such specificity can be used for reinforcing the non-bypass properties of the filtering.

The use of Gigabit Ethernet along the filtering chain ensures limited crossing times between the domains 12 and 13 so as to obtain crossing times of less than 50 ms, as per the avionics requirements. Indeed, the Ethernet protocol can be used for returning a flow very quickly after having received the last fragment of a message. Without fast retransmission to the next node, the gateway crossing time would be greatly affected, in particular for long fragmented messages, since the protocol break can only occur on a complete message and not on a fragment thereof. The internal links along the filtering chain thus have a bandwidth greater than the bandwidth of the connections used for connecting the gateway to the high- and low-trust domains.

All nodes provided on the card are synchronized by a single clock, which is controlled by the master node 1. In this way, with simple software sequencers where each node is shifted in the execution of the tasks thereof, so that the end of a task of one node is synchronized with the beginning of the task of the next node along the filtering chain, the crossing time of the gateway is optimized by taking into account, the time of the processing operations independently performed by each of the nodes arranged in series along the filtering chain.

Operation/Use

FIG. 2 illustrates a plurality of possible operations of the gateway 10 which was just presented.

According to a first way of working 100, the master node 1 performs a simple filtering of the data flows traveling from the low-trust domain 12 to the high-trust domain 13.

A request message is sent from the domain 13 to a server in the domain 12. The gateway 10, which is cut off between the two domains, receives the request message.

The request message is first received (step 110) by the node 6, which sends same (112) directly and without any change of format, to the firewall node 4 via the link U64. In turn, the node 4 sends same (114) to the domain 12.

On the domain 12, the request message is routed to the destination server, which prepares an appropriate response message.

The response message is returned from the low-trust domain 12 to the high-trust domain 13. The response message consequently crosses through the gateway 10.

More precisely, the response message is received (115) by the firewall node 4. After positive checking, the node 4 forwards same (116) to the formatting node 5.

The latter performs the protocol break and, in the event of success, sends (117) the response message transcribed in the neutral format, to the master node 1.

Upon reception of the response message, the master node 1 applies appropriate filtering processing operations.

In the case of positive filtering, the response message is sent (118) by the master node 1 to the inverse formatting node 6. The latter converts the response message according to the required format and sends same (119) onto the high-trust domain 13.

According to a second operation 200, the master node 1 performs contextual filtering, in the present a case a consistency check between request and response messages.

A request message is sent from the high-trust domain 13 to a server of the low-trust domain 12. The gateway 10, cut-off between the two domains, receives the request message.

The request message is received (step 210) by the inverse formatting node 6. Taking into account e.g. the value of a field in the header of the request message, the node 6 applies a protocol break to the request message and sends (211) the request message in the neutral format to the master node 1.

Finding out that same is a request, the master node 1 stores e.g. the identifier of the request in order to perform the consistency check later.

The master node 1 sends (step 212) the request message to the formatting node 5, which applies an inverse protocol break and sends (213) the request message in the appropriate format to the node 4.

In turn, the latter sends (214) the request message to the domain 12.

On the domain 12, the request message is routed to the destination server, which prepares an appropriate response message.

The response message is sent from the low-trust domain to the high-trust domain. The response message consequently crosses through the gateway 10.

The response message is returned from the low-trust domain 12 to the high-trust domain 13. The response message consequently crosses through the gateway 10.

More precisely, the response message is received (215) by the firewall node (4), which sends same (216), after checking, to the formatting node (5).

The latter performs the protocol break and, in the event of success, sends (217) the response message in the neutral format, to the master node 1.

Upon reception of the response message, the master node 1 applies the appropriate filtering processing operations and the consistency check. To this end, same checks whether the identifier contained in the response message corresponds to the identifier contained in the request message previously processed by the master node 1.

In the event of a positive check, the response message is sent (step 218) by the master node 1 to the node 6, which, after an inverse protocol break, sends same back (219) to the high-trust domain 13.

In the event of a negative check, the response message is rejected by the master node 1 and an entry relating to the failure of the consistency processing is added to the log file maintained by the service module 2.

According to a third operation 300, the low-trust domain 12 applies to the gateway a request message for switching to download, e.g. a request to download a software update for the firewall node 4.

A request message for switching to downloading is received (step 310) from the low-trust domain 12 by the firewall node 4.

After positive check, the firewall node 4 sends same (311) to the formatting node 5.

The node 5 performs the protocol break and sends (312) to the master node 1, a request message for switching to downloading in neutral format.

The master node 1 analyzes the request message for switching to downloading. In particular, same checks that the current operation of the aircraft is compatible with switching to a gateway download mode. Indeed, e.g. if the aircraft is in flight, the master node 1 rejects the download request because the download could be detrimental to the overall operating safety of the aircraft.

In the event of a positive check, the master node 1 switches the gateway into a downloading mode of operation.

Same sends (313) a download management control message to the service node 2, but via the node 6.

Finding out that same is a message to the node 2, the node 6 routes (314) the control message to the node 2, along link B62.

Upon reception of the of the control message, the service module 2 manages the downloading. The file is downloaded from the domain 12 to the node 2 through the nodes 4, 5, 1, and 6.

E.g. the node 2 stores (315) the downloaded file in a flash memory of the firewall node 4.

At the end of the download, the node 2 indicates the end of the operation to the master node 1.

The master node 1 then controls a restart of the gateway 10, during which the firewall node 4 reinitializes the contents of the RAM thereof with the information contained in the flash memory associated therewith, and thus with the update file just downloaded.

Advantages

By physically segregating the different functions, the gateway which was just presented reaches the required security levels for the avionics domain, which would not be the case for a simple software segregation.

The architecture of the gateway, based on different physically independent nodes, simplifies the proofs of the proper development of security functions. E.g. according to the ED-203A standard, the master node 1 and the protocol break node 5 are advantageously developed according to the highest level, SAL3; the firewall node 4 according to the intermediate level, SAL2; and the security node 2 and the inverse protocol break node 6 according to the lowest level, SAL1.

In particular, the protocol break has been developed in SAL3 so as to be apt to reach a good level of filtering with the highest level of quality assurance of cybersecurity.

It should be noted that these last two nodes benefit from the level of criticality of the high criticality domain since same are situated downstream of the master node 1 and since all the data flows that same receive are first filtered by the firewall, protocol break and master nodes.

The service node is often very complex. It would be complicated and costly to develop same according to the SAL2 level. The invention can be thus used for relaxing the development constraints on such component, while ensuring that the component cannot be used for bypassing the filtering of flows, which always travel back to the master node.

The architecture is thus used for isolating tasks according to the criticality thereof and to the associated quality assurance levels thereof, while ensuring a crossing point for the different flows, for providing systematic filtering. The gateway is used for achieving high quality filtering by using different technologies depending on the flows.

The proposed solution ensures that all data flows from the low security domain pass through the master node. Such architecture ensures that the filtering function is not bypassed.

With such architecture, crossing times can be quite short while ensuring non-bypass properties required by the high level of cybersecurity quality assurance required.

According to said architecture, the master node is not directly related to the low-trust domain: same only receives flows which passed through two filtering operations, the filtering performed by the firewall and the filtering performed by the protocol break.

In the preferred embodiment presented hereinabove, the different data processing nodes are integrated into the same electronic board, which leads to a solution having a reduced form factor, which is advantageous insofar as the volume constraints are strong constraints in the avionics field. In a variant, the processing nodes are installed on a plurality of electronic boards connected to one another in a suitable manner.

The modular aspect facilitates the development, certification, maintenance, and the updating of the gateway.

It should be noted that the present gateway includes only one firewall, arranged at the input connected to the low-trust network domain.

It should be also be noted that the gateway is configurable, which makes it possible to set the parameters of the different filtering functions according to the current threats.

The invention claimed is:

1. A network security gateway onboard an aircraft, connecting a low-trust domain and a high-trust domain of an avionics IT infrastructure, the network security gateway providing a plurality of security functions, each security function being performed by a data processing node, wherein the network security gateway comprises, a filtering chain for filtering a data flow received from the low-trust domain, and the filtering chain comprises, connected in series:

a firewall data processing node, interfaced with the low-trust domain;

a protocol break data processing node;

a master data processing node; and, an inverse protocol break data processing node, interfaced with the high-trust domain, wherein the network security gateway further comprises a security data processing node connected to each of the data processing nodes of the filtering chain, wherein the data flow coming from the low trust domain is forced to pass successively through the firewall data processing node, the protocol break data processing node and the master data processing node which is physically achieved by means of the communication links between the nodes, wherein when the data flow coming from the low-trust domain is accepted by the firewall data processing node, the data flow is resent to the protocol break data processing node otherwise the data flow is rejected, the firewall data processing node generates logging information and sends the logging information to the security data processing node, wherein when the data flow from the firewall data processing node is successfully broken by the protocol break data processing node, the data flow is resent, in a neutral format, to the master data processing node, otherwise the data flow is rejected, the protocol break data processing node generates new logging entries and sends the new logging entries to the security data processing node, wherein the different data processing nodes are integrated into the same electronic board while being physically segregated, wherein the master data processing node executes an intrusion detection application;

wherein a piece of detection information generated by the intrusion detection application is sent to the security data processing node as an entry of a log file, and wherein the different data processing nodes are synchronized by a single clock, which is controlled by the master data processing node.

2. The network security gateway according to claim 1, wherein each pair of data processing nodes of the filtering chain are connected by bidirectional links, each bidirectional link having a larger bandwidth than the bandwidth of the connections used for connecting the gateway to the high-and low-trust domains.

3. The network security gateway according to claim 1, wherein the security data processing node is connected to the plurality of data processing nodes of the filtering chain by unidirectional links.

4. The network security gateway according to claim 1, wherein the network security gateway forms an Ethernet and/or ARINC 429 and/or ARINC 664 interface with the high-trust domain and an Ethernet and/or ARINC 429 and/or ARINC 664 interface with the low-trust domain.

5. The network security gateway according to claim 1, wherein the firewall data processing node is connected to the low-trust domain by a first conversion module, that performs a conversion of a format of a data flow from the low-trust domain into a data format expected by the firewall data processing node.

6. The network security gateway according to claim 5, wherein the format of a data flow from the low-trust domain is ARINC 429 format.

7. The network security gateway according to claim 1, wherein the inverse protocol break data processing node is connected to the high-trust domain by a second conversion module, that performs a conversion from a format of a data flow delivered by the inverse protocol break data processing node into a format expected by the high-trust domain.

8. The network security gateway according to claim 7, wherein the format expected by the high-trust domain is ARINC 664 format.

9. The network security gateway according to claim 1, wherein the master data processing node filters a data flow according to a context or a level of priority.

10. The network security gateway according to claim 1, wherein any data flow coming from the low-trust domain passes through the master data processing node, provided that the data flow has not been rejected by the firewall data processing node or by the protocol break data processing node.

11. The network security gateway according to claim 1, wherein, in addition to an interface with the low-trust domain, the firewall data processing node has only one output port forcing the routing of any operational data flow coming from the low-trust domain to the protocol break data processing node, and wherein, in addition to an interface with the firewall data processing node, the protocol break data processing node has only one output port forcing the routing of any operational data flow coming from the low-trust domain to the master data processing node.

12. The network security gateway according to claim 1, wherein any data flow coming from the high-trust domain and addressed to the low-trust domain and which does not pass through the master data processing node, is routed through the network security gateway via at least one unidirectional link.

13. The network security gateway according to claim 1, including only one firewall data processing node situated at the input of the filtering chain on the side of the low-trust domain.

14. The network security gateway according to claim 1, wherein the different data processing nodes are integrated into the same electronic board.

* * * * *